US006175781B1

United States Patent
Gesele et al.

(10) Patent No.: US 6,175,781 B1
(45) Date of Patent: Jan. 16, 2001

(54) METHOD FOR DETECTING LATERALLY INCLINED BENDS

(75) Inventors: Frank Gesele, Ingolstadt; Holger Maier, Schwaikheim, both of (DE)

(73) Assignee: DaimlerChrysler AG, Stuttgart (DE)

( * ) Notice: Under 35 U.S.C. 154(b), the term of this patent shall be extended for 0 days.

(21) Appl. No.: 09/310,606

(22) Filed: May 12, 1999

(30) Foreign Application Priority Data

May 15, 1998 (DE) .............................................. 198 21 618

(51) Int. Cl.$^7$ ....................................................... G01C 9/06
(52) U.S. Cl. .................. 701/1; 701/65; 701/94; 280/5.502; 280/5.506; 303/139
(58) Field of Search ................... 701/1, 36, 37, 701/38, 80, 65, 94; 280/5.502, 5.506; 303/139, 140

(56) References Cited

U.S. PATENT DOCUMENTS

| 5,159,991 | * | 11/1992 | Tsuyama et al. ..................... 180/197 |
| 5,357,798 | * | 10/1994 | Weinzerl et al. ...................... 73/146 |
| 5,369,580 | * | 11/1994 | Monji et al. ............................. 701/1 |
| 5,406,486 | * | 4/1995 | Kamio et al. .......................... 701/84 |
| 5,461,564 | * | 10/1995 | Collins et al. ......................... 701/37 |
| 5,557,520 | | 9/1996 | Suissa et al. . |
| 5,668,724 | * | 9/1997 | Ehret et al. ............................. 701/80 |
| 5,700,073 | * | 12/1997 | Hiwatashi et al. .................... 303/146 |
| 5,797,109 | | 8/1998 | Aminpour et al. . |
| 5,826,204 | * | 10/1998 | Ulm ......................................... 701/1 |
| 5,906,650 | * | 5/1999 | Tsuno et al. ........................... 701/71 |
| 5,948,027 | * | 9/1999 | Oliver, Jr. et al. .................... 701/37 |
| 5,978,724 | * | 11/1999 | Sekine .................................... 701/70 |
| 5,978,731 | * | 11/1999 | Matsuda ............................... 701/208 |
| 6,073,065 | * | 6/2000 | Brown et al. .......................... 701/36 |
| 6,112,147 | * | 8/2000 | Ghoneim et al. ...................... 701/80 |

FOREIGN PATENT DOCUMENTS

| 4325413 C2 | 7/1993 | (DE) . |
| 4443522 A1 | 12/1994 | (DE) . |
| 0769701 A1 | 4/1997 | (EP) . |

* cited by examiner

Primary Examiner—William A. Cuchlinski, Jr.
Assistant Examiner—Olga Hernandez
(74) Attorney, Agent, or Firm—Mark P. Calcaterra

(57) ABSTRACT

A method for detecting laterally inclined bends being traversed by a vehicle uses a bend-specific value, such as the rotation rate, lateral acceleration or steering angle of the vehicle, the bend-specific value being simultaneously determined by a plurality of different measuring systems. The plurality of determined values are sorted by magnitude to obtain an indication of whether a laterally inclined bend is being encountered by the vehicle.

11 Claims, 4 Drawing Sheets

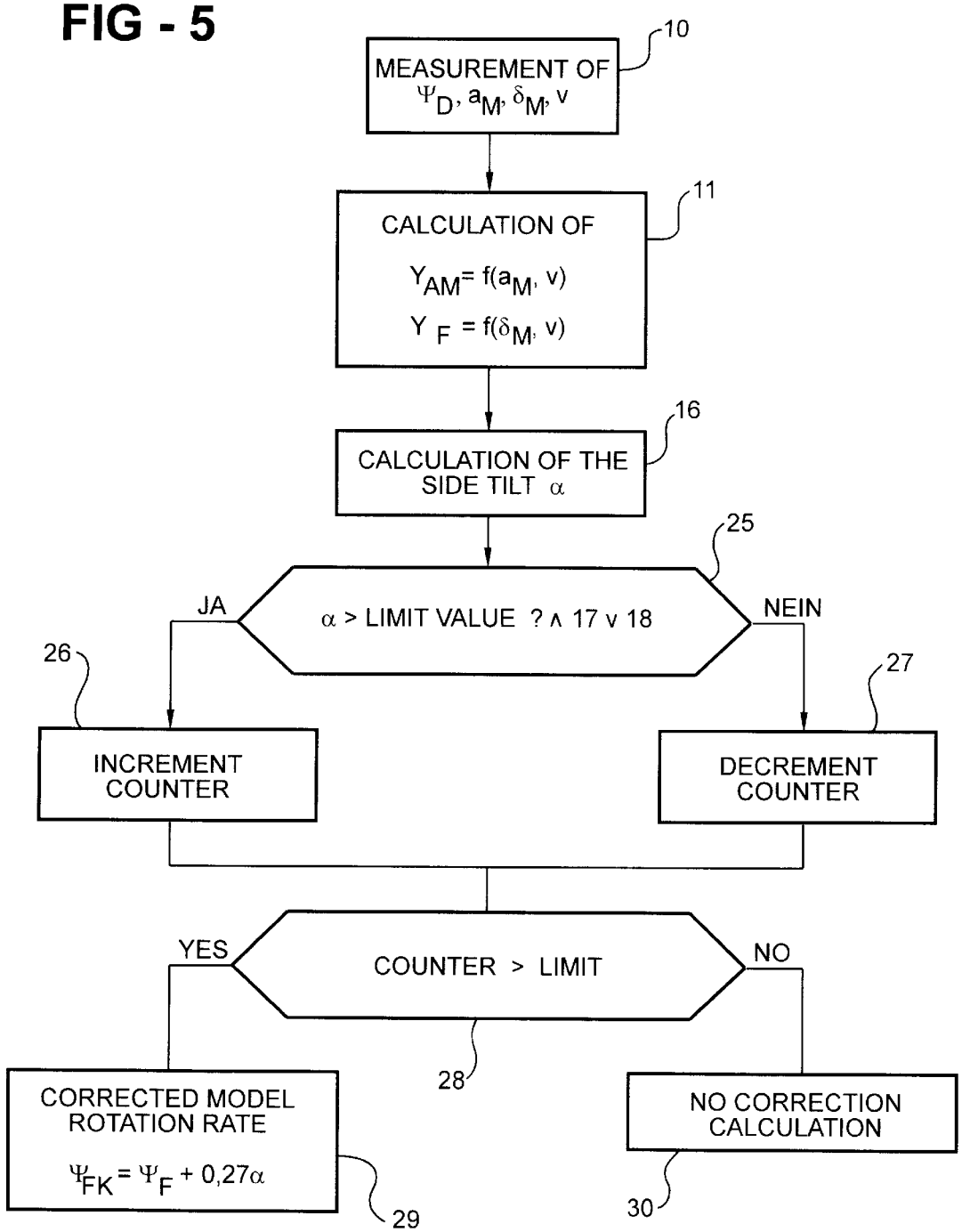

METHOD FOR DETECTING LATERALLY INCLINED BENDS

The invention relates to a method for detecting laterally inclined bends.

In determining or assessing a driving situation within the scope of a vehicle dynamics stability controller, such as in ESP (Electronic Stability Program), errors arise in evaluating the vehicle state when traversing a laterally inclined bend which is distinguished by a side tilt with respect to the horizontal. One reason for this is the fact that parameters which characterize the respective vehicle state are additionally influenced by gravitation or centrifugal forces. A laterally inclined bend can be traversed in the extreme case without actuating the steering wheel. A vehicle dynamics stability controller perceives absence of the steering wheel displacement, but detects a rotation rate with reference to the Z-axis and a lateral acceleration with reference to the Y-axis. The result of this is that the vehicle dynamics stability controller is activated and initiates incorrect interventions in the vehicle dynamics. Instances of incorrect tripping of motor vehicle safety systems can also occur. For this reason, it is necessary in the extreme case, for example, for the ESP to be switched off by the driver when a laterally inclined bend is being traversed.

DE 43 25 413 C2 discloses a method for determining parameters which characterize the driving condition of a motor vehicle, such as rotation rate, lateral acceleration, steering angle, speed, acceleration, wheel speeds etc. The angle of inclination is required here as a state variable for exact calculation of the vehicle state. However, it is disadvantageous in this case that no indication is given of how an angle of inclination is detected qualitatively or quantitatively.

Various methods are known for detecting the vehicle inclination and/or that of the roadway inclination with respect to the horizontal.

EP 0 769 701 A1 discloses a device for a vehicle which contains two acceleration sensors. These two acceleration sensors are arranged at a defined angle to the horizontal plane. Without vehicle inclination, the acceleration sensors indicate the same deviation from the vehicle lateral acceleration actually present. It is possible for the vehicle inclination, and from this the actual vehicle acceleration, to be calculated in accordance with the vehicle inclination by forming the difference and sum of the two sensor signals.

However, it is disadvantageous in this case that a plurality of acceleration sensors are required, and that these acceleration sensors serve only to detect a side tilt of the motor vehicle. This solution turns out to be very cost intensive. Again, it requires additional space. A further disadvantage consists in the two identical, but differently installed measuring systems do not reliably detect the correct angle of inclination of the roadway in every driving situation, and falsely indicate an angle of inclination in the case of swerving or roadway bumpiness.

Another method for determining the roadway inclination in the longitudinal direction is disclosed in DE 44 43 522 A1. Here, a freely rolling state, at least of one driven axle of the vehicle, is detected at least once. In this state, the wheels of the driven axles also roll without slipping The differential speed of a non-driven axle is determined for the purpose of balancing the wheel speeds between the driven axles. The value of the braking ratio, that is to say the vehicle deceleration, is measured simultaneously. The values determined for the differential speed and the braking ratios are used to determine the value of an inclination constant. The roadway inclination can be determined with the aid of the inclination constant from the values determined for the differential speed and braking ratio.

It is disadvantageous in this case that only the inclination of the roadway in the longitudinal direction can be measured, and that a freely rolling state must be brought about for a measurement, in order to detect a roadway inclination at all.

SUMMARY OF THE INVENTION

It is therefore the object of the invention to specify a method which overcomes these disadvantages and increases the reliability of such systems.

A parameter specific to the driving condition, such as, for example, the rotation rate, is simultaneously measured with different measuring systems which are present in the vehicle and are based on different physical methods, and a comparison of the magnitudes of these values of the parameter obtained in different ways is used to detect a transversely directed roadway inclination.

The advantages achieved with the invention are the reliability of this detection of inclination and the ease of handling since, for example, a rotation rate sensor, a lateral acceleration sensor and a steering angle sensor are installed in most vehicles. These three different systems can be used in each case to measure directly the same parameter of the vehicle which is specific to the driving condition, for example the rotation rate, or to determine it via the measured lateral acceleration and via the steering angle with the aid of the measured speed In most applications, it suffices to detect whether or not there is any roadway inclination present at all, without detecting an exact value of the roadway inclination. It can be ensured thereby that, for example, the dynamic vehicle controller knows whether or not it is operating accurately. Again, such an uncomplicated, quick detention of a roadway inclination can serve the purpose of activating or deactivating a more complicated system for exactly determining the angle of inclination.

Advantageous developments follow from other aspects of the inventions. It is possible to distinguish between a right-hand bend and a left-hand bend with an inclined roadway by a simple comparison of magnitudes. If an angle of inclination is detected with the aid of this method, and if this angle of inclination is then measured exactly by a further system, an advantageous version of this method can be used to distinguish under all possible conditions and always beyond doubt between an actual roadway inclination or another vehicle state. It is possible to differentiate roadway bumpiness, swerving processes and tripping processes reliably from traversing a laterally inclined bend.

BRIEF DESCRIPTION OF THE DRAWING

It is the intention below to describe the invention with the aid of an exemplary embodiment.

In the drawing:

FIG. 3B shows the vehicle with a representation of the rotation rate which is detected by the rotation rate sensor in the case of a vehicle on a right-hand bend with an inclined roadway, FIG. 5A shows the vehicle with a representation of the rotation rate which is determined with the aid of the lateral acceleration sensor in the case of a vehicle on a left-hand bend with an inclined roadway, and FIG. 5B shows the vehicle with a representation of the rotation rate which is determined with the aid of the lateral acceleration sensor in the case of a vehicle on a right-hand bend with an inclined roadway.

DETAILED DESCRIPTION

Figure 1:
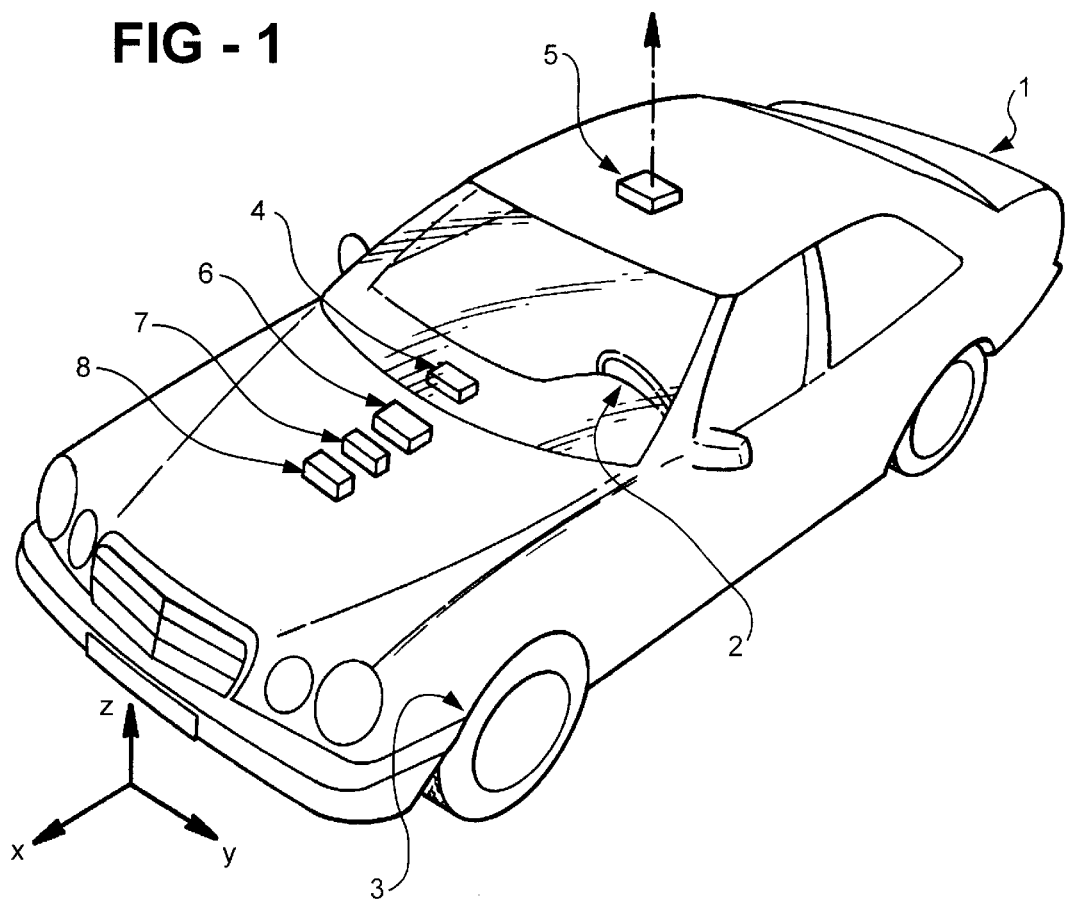
FIG. 1 shows a vehicle having devices for detecting a laterally inclined roadway on bends.

FIG. 1 shows a motor vehicle 1 which contains all the devices for detecting a laterally inclined bend. Located in this motor vehicle is a steering angle sensor 2 which determines the steering angle δ, that is to say the position of the wheels, on the basis of a steering angle. Also located in the motor vehicle 1 is a speed sensor 3 which detects the speed v via the number of wheel revolutions. A lateral acceleration sensor 4 measures the lateral acceleration $a_M$, which is perpendicular to the speed v and parallel to the vehicle plane. The rotation rate sensor 5, likewise fastened on the vehicle 1, measures the rotation rate ($\dot{\Psi}_D$), which is perpendicular to the speed v and perpendicular to the vehicle plane. The data obtained by means of the various sensors are read into an evaluation unit 6 in which it is calculated whether or not a laterally inclined bend is being traversed. The information whether or not such a bend is being traversed has the effect, depending on status, of raising or lowering a value in a counter 7. If the value is within a defined range, the information as to whether a laterally inclined bend is present is relayed to a consumer 8, in particular a vehicle dynamics stability controller or a motor vehicle safety system, which then takes the appropriate measures.

Figure 2:
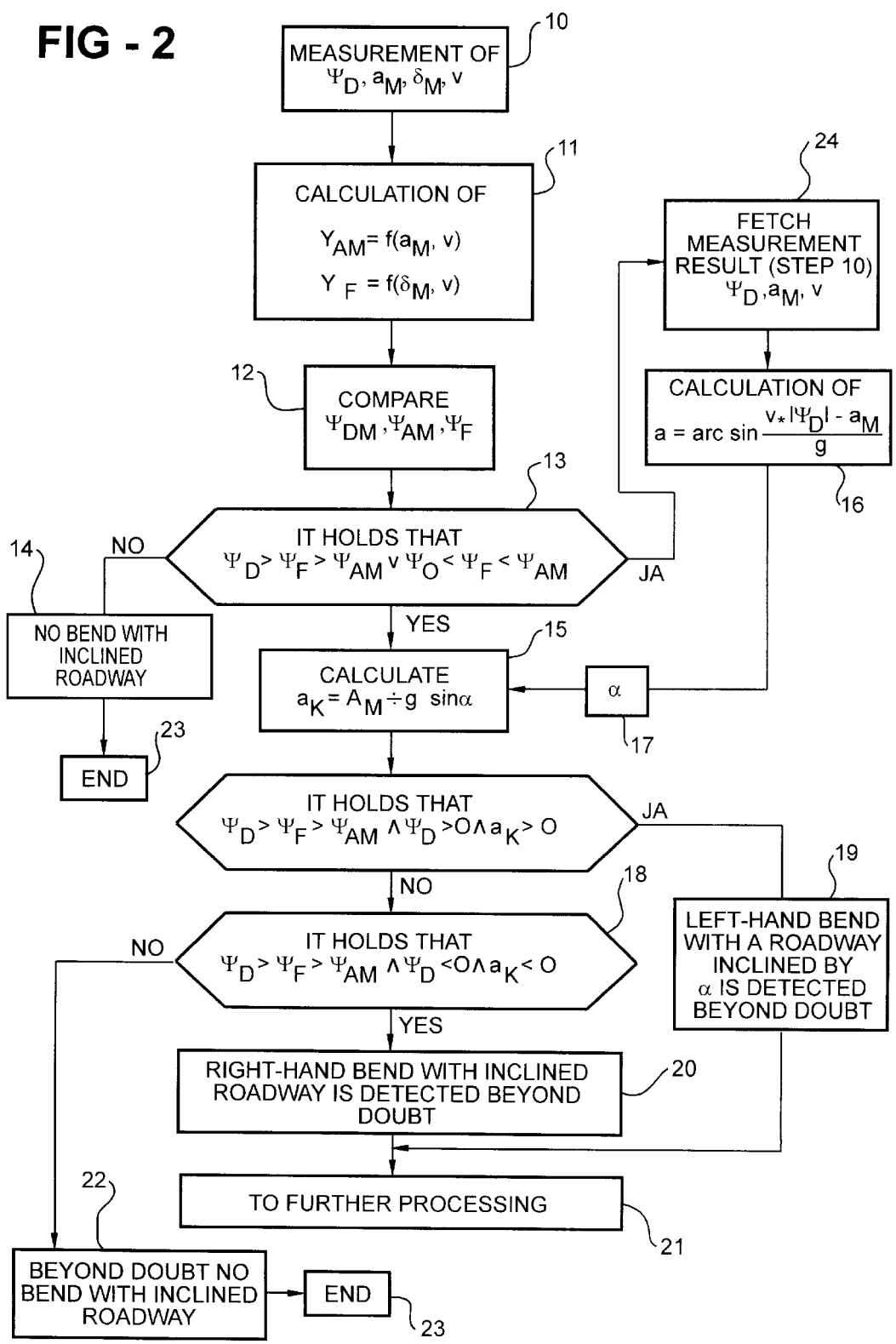
FIG. 2 shows a flowchart for detecting laterally inclined bends.

FIG. 2 shows a flowchart for detecting laterally inclined bends. In the first step 10, the rotation rate $\dot{\Psi}_D$, the lateral acceleration $a_M$, the steering angle $\delta_M$ and the speed v are measured. The further rotation rates:

$$\dot{\Psi}_{AM} = f(a_M, v) = \frac{a_M}{v} \text{ and } \dot{\Psi}_F = f(\delta_M, v)$$

are calculated in step 11. A comparison of the magnitudes of the rotation rates obtained in different ways is performed in step 12. If the condition:

$$\dot{\Psi}_D > \dot{\Psi}_F > \dot{\Psi}_{AM}$$

or $$\dot{\Psi}_D < \dot{\Psi}_F < \dot{\Psi}_{AM}$$

is not fulfilled, it is detected beyond doubt in step 14 that no bend with an inclined roadway is present. The determination method is therefore terminated in step 23. If, however, one of the conditions from step 12 is fulfilled, the angle of inclination α is determined in a further step 16 by means of a measuring device and is used in step 15 to calculate a lateral acceleration corrected for the gravitational accelera-tion. Up to this point, it cannot be ensured 100% that the vehicle is actually traversing a bend with an inclined roadway. It is necessary for this reason to perform further value considerations as represented in steps 17 and 18. If, as represented in step 17, the condition:

$$\dot{\Psi}_D > \dot{\Psi}_F > \dot{\Psi}_{AM} \cdot \dot{\Psi}_D > 0 \cdot \alpha_K > 0$$

is fulfilled, a left-hand bend with an inclined roadway is detected beyond doubt in step 19. The angle of inclination α determined by means of a measuring device is thereby verified, as represented in step 16. All the data are released and can then be used in step 21 for further processing in other systems, in particular in a vehicle dynamics stability controller or a motor vehicle safety system. If the condition does not hold, the condition:

$$\dot{\Psi}_D < \dot{\Psi}_F < \dot{\Psi}_{AM} \cdot \dot{\Psi}_D < 0 \cdot \alpha_K < 0$$

is checked in step 18. If this is fulfilled, a right-hand bend with an inclined roadway is detected beyond doubt in step 20. The data are then made available in step 21 for further processing in other systems, in particular in a vehicle dynamics stability controller or a motor vehicle safety system. If, however, the condition is not fulfilled in step 18, it is detected beyond doubt in step 22 that no bend with an inclined roadway is present. Further calculations are terminated thereafter in step 23.

Figure 3:
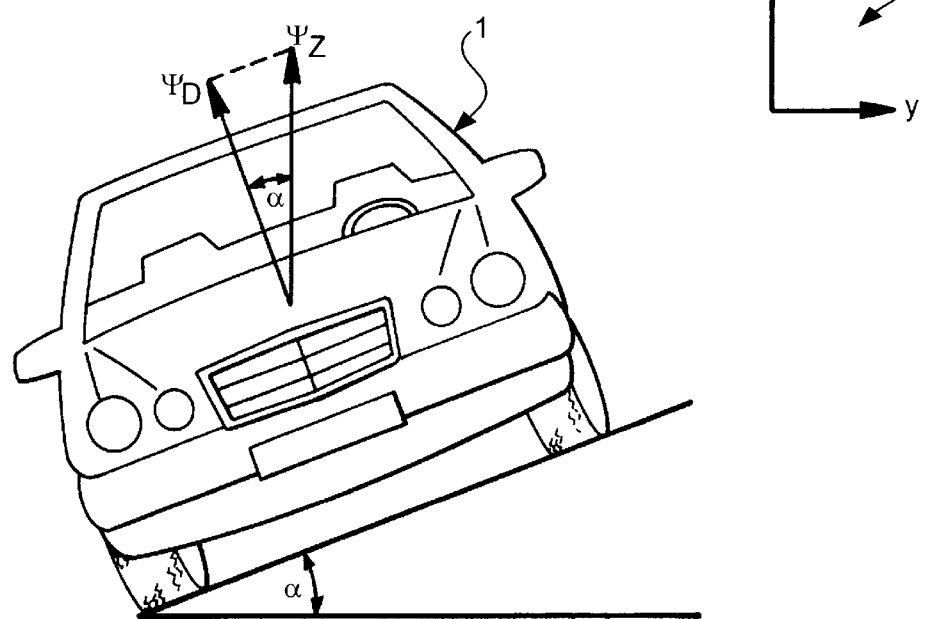
FIG. 3 shows the vehicle with a representation of the rotation rate which is detected by the rotation rate sensor in the case of a vehicle on a left-hand bend with an inclined roadway.

FIG. 3A shows a vehicle on a left-hand bend. The inclined on the bend by the angle α. The rotation rate $\dot{\Psi}_D$, which is measured by the rotation rate sensor, is perpendicular to the inclined plane of the roadway. The rotation rate, which actually points in the z-direction, as represented in the coordinate system 9, is denoted by $\dot{\Psi}_{Dz}$. It holds that:

$$\frac{|\dot{\Psi}_D|}{|\dot{\Psi}_{Dz}|} = \cos\alpha$$

FIG. 3B shows a vehicle on a right-hand bend. The roadway is inclined on the bend by the angle α. The rotation rate $\dot{\Psi}_D$, which is measured by the rotation rate sensor, is perpendicular to the inclined plane of the roadway. The rotation rate, which actually points in the z-direction, as represented in the coordinate system 9, is denoted by $\dot{\Psi}_{Dz}$. It holds that:

$$\frac{|\dot{\Psi}_D|}{|\dot{\Psi}_{Dz}|} = \cos\alpha$$

Figure 4:
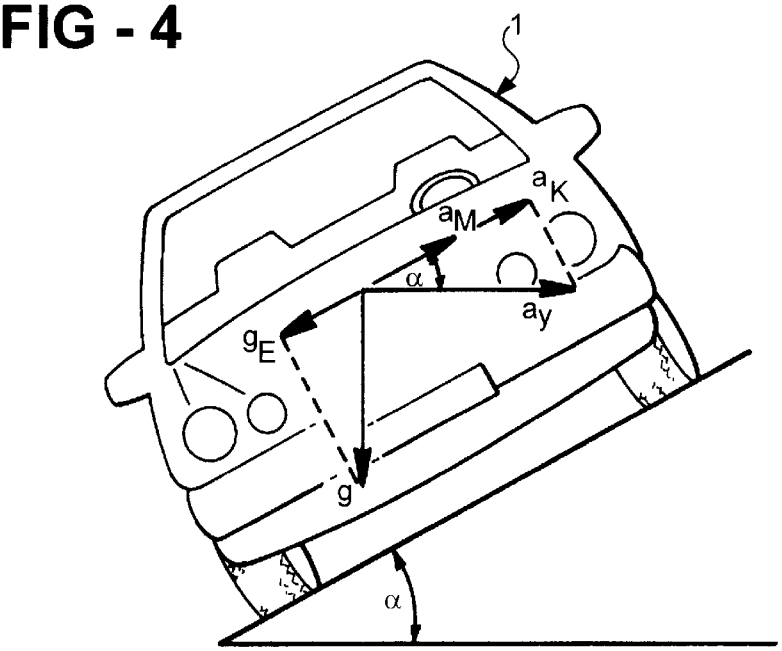
FIG. 4A shows the vehicle with the representation of a rotation rate which is determined with the aid of the steering angle sensor in the case of a vehicle on a left-hand bend with an inclined roadway.
FIG. 4B shows the vehicle with a representation of the rotation rate which is determined with the aid of the steering angle sensor in the case of a vehicle on a right-hand bend with an inclined roadway.

FIG. 4A shows a vehicle on a left-hand bend. The roadway is inclined on the bend by the angle α. The rotation rate $\dot{\Psi}_F$, which is calculated with the aid of the steering angle sensor, is perpendicular to the inclined plane of the roadway. The rotation rate, which actually points in the z-direction, is denoted by $\dot{\Psi}_{Fz}$. It holds that:

$$\frac{|\dot{\Psi}_F|}{|\dot{\Psi}_{Fz}|} = \cos\alpha \wedge |\dot{\Psi}_F| = f(\delta_M, v)$$

$\delta_M$ being the steering angle measured by the steering angle sensor and v being the measured speed of the vehicle.

Furthermore, the definition holds that the steering angle $\delta_M$ is always positive on a left-hand bend.

FIG. 4B shows a vehicle on a right-hand bend. The roadway is inclined on the bend by the angle α. The rotation rate $\dot{\Psi}_F$, which is calculated with the aid of the steering angle sensor, is perpendicular to the inclined plane of the roadway. The rotation rate, which actually points in the z-direction, is denoted by $\dot{\Psi}_{F_z}$. It holds that:

$$\frac{|\dot{\Psi}_F|}{|\dot{\Psi}_{F_z}|} = \cos\alpha \wedge |\dot{\Psi}_F| = f(\delta_M, v)$$

$\delta_M$ being the steering angle measured by the steering angle sensor and v being the measured speed of the vehicle.

Furthermore, the definition holds that the steering angle $\delta_M$ is always negative on a right-hand bend.

FIG. 5A shows a vehicle on a left-hand bend. The roadway is inclined on the bend by the angle $\alpha$. The rotation rate $\dot{\Psi}_{AM}$, which is calculated with the aid of the lateral acceleration sensor, is perpendicular to the inclined plane of the roadway. It holds that:

$$|\dot{\Psi}_{AM}| = \left|\frac{a_M}{v}\right|$$

$a_M$ being the lateral acceleration measured by the lateral acceleration sensor and v being the measured speed of the vehicle. However, this calculated value is falsified by the co-measured gravitational acceleration g. If this error is removed from the calculation, it holds that:

$$\frac{|\dot{\Psi}_A|}{|\dot{\Psi}_{A_z}|} = \cos\alpha \wedge |\dot{\Psi}_A| = \left|\frac{a_K}{v}\right| = \left|\frac{a_M + g\cdot\sin\alpha}{v}\right|$$

$a_K$ being the corrected measured lateral acceleration from which the component of the gravitational acceleration has been removed from the calculation. The rotation rate which has been relieved of the component of the gravitational acceleration and actually points in the z-direction is denoted by $\dot{\Psi}_{A_z}$. The component of the lateral acceleration, which actually points in the y-direction, as represented in the coordinate system 9, is denoted by $a_Y$. Furthermore, it holds by definition that the lateral acceleration $a_Y$ is always positive on a left-hand bend.

FIG. 5B shows a vehicle on a right-hand bend. The roadway is inclined on the bend by the angle $\alpha$. The rotation rate $\dot{\Psi}_{AM}$, which is calculated with the aid of the lateral acceleration sensor, is perpendicular to the inclined plane of the roadway. It holds that:

$$|\dot{\Psi}_{AM}| = \left|\frac{a_M}{v}\right|$$

$a_M$ being the lateral acceleration measured by the lateral acceleration sensor and v being the measured speed in the x-direction of the vehicle.

However, this calculated value is falsified by the co-measured gravitational acceleration g. If this error is removed from the calculation, it holds that:

$$\frac{|\dot{\Psi}_A|}{|\dot{\Psi}_{A_z}|} = \cos\alpha \wedge |\dot{\Psi}_A| = \left|\frac{a_K}{v}\right| = \left|\frac{a_M + g\cdot\sin\alpha}{v}\right|$$

$a_K$ being the corrected measured lateral acceleration from which the component of the gravitational acceleration has been removed from the calculation. The rotation rate which has been relieved of the component of the gravitational acceleration and actually points in the z-direction is denoted by $\dot{\Psi}_{A_z}$. The component of the lateral acceleration, which actually points in the y-direction, as represented in the coordinate system 9, is denoted by $a_Y$. Furthermore, the definition holds that the lateral acceleration $a_Y$ is always negative on a right-hand bend.

If a bend with a laterally inclined roadway is traversed, the following empirical values are known. The rotation rate measured with the rotation sensor always has the highest absolute value, it is influenced only by the angle of inclination of the roadway. The steering angle when traversing a bend with an inclined roadway is always smaller by virtue of the centrifugal force than on a bend with a flat roadway. Because of the inclined roadway, the cornering is at least partially forced. The rotation rate which is calculated from the measured steering angle is additionally influenced by the centrifugal force. The rotation rate which is calculated from the lateral acceleration is additionally falsified by the force of gravity. The influence of the force of gravity is always greater than the influence of the centrifugal force.

It becomes clear on the basis of this consideration and from the figures that the following conditions must be fulfilled in the case of cornering with an inclined roadway. It must hold when traversing a left-hand bend with an inclined roadway that:

$$\dot{\Psi}_D > \dot{\Psi}_F > \dot{\Psi}_{AM}$$

It must hold when traversing a right-hand bend with an inclined roadway that:

$$\dot{\Psi}_D < \dot{\Psi}_F < \dot{\Psi}_{AM}$$

If one of these conditions is fulfilled, this is an indication that a bend with an inclined roadway is being traversed. It is now possible, for example, for a dynamic vehicle controller which is operating impermissibly on inclined bends and not carrying out any correction calculations as regards inclination to be switched off, or else, for example, a device for exactly calculating the angle of inclination is activated in the case of a dynamic vehicle controller in which correction calculations are possible as regards the angle of inclination. If the angle of inclination is known, it is possible to activate a further interrogation which serves the purpose of unambiguously verifying the cornering on an inclined roadway. The following conditions must be fulfilled in the case of cornering on an inclined roadway, in order to be able to determine this condition beyond doubt.

In the case of an inclined left-hand bend, it must hold that:

$$\dot{\Psi}_D > \dot{\Psi}_F > \dot{\Psi}_{AM}, \dot{\Psi}_D > 0, a_k = a_M + g\cdot\sin\alpha > 0$$

In the case of an inclined right-hand bend, it must hold that:

$$\dot{\Psi}_D < \dot{\Psi}_F < \dot{\Psi}_{AM}, \dot{\Psi}_D < 0, a_k = a_M + g\cdot\sin\alpha < 0$$

If these conditions are fulfilled, the condition of cornering on an inclined roadway is detected beyond doubt. A device which is operating defectively under these conditions can then be switched off, or corrective measures can be activated in the case of systems which take account of this condition.

In order further to increase the reliability of such a system, a counter can additionally be installed in a device which operates in accordance with this method. If the previously described conditions are fulfilled, and the angle $\alpha$ overshoots a specific value, for example 10°, the value of the counter is raised by 1 every 7 ms, for example. If the counter overshoots the value 25, for example, the bend with a side tilt is detected. If the conditions remain fulfilled, the counter is incremented up to the maximum value of 40, for example. If the conditions no longer apply, the counter is decremented as far as the value 0, for example. In the case when the value 25 is undershot, the system no longer detects an inclination.

It is obvious that this method can also be implemented by comparing the corresponding measured and calculated lateral accelerations or steering angles. The principle here is merely that one and the same parameter be measured with different measuring systems, the measurement results achieved in different ways on a bend with lateral inclination containing different measuring errors. In the case of driving on a non-inclined roadway, however, the results would be identical. Conclusions as to the inclination of the roadway can be drawn on the basis of these measuring errors, which come about because of the inclination of the roadway.

What is claimed is:

1. A method for detecting a laterally inclined bend traversed by a vehicle comprising the steps of:

selecting a vehicle operating condition parameter;

determining a plurality of values of the selected parameter simultaneously by means of a like plurality of different measuring systems which are based on different physical methods; and detecting the laterally inclined bend by a comparison of magnitudes of absolute values of the plurality of values simultaneously determined by the different measuring systems.

2. The method as claimed in claim 1, wherein the vehicle operating condition parameter comprises a rotation rate ($\Psi$) of the vehicle and wherein the plurality of values of the rotation rate are determined by:

a rotation rate sensor producing a first rotation rate value ($\Psi_D$), a lateral acceleration sensor producing a lateral acceleration ($a_M$) and a speed sensor producing a vehicle speed (v), $a_M$ and v used to calculate a second rotation rate value ($\Psi_{AM}$), and a steering angle sensor producing a steering angle $\delta_M$ and a speed sensor producing a vehicle speed (v), $\delta_M$ and v used to calculate a third rotation rate value ($\Psi_F$).

3. The method as claimed in claim 1, wherein the vehicle operating condition parameter comprises a lateral acceleration (a) of the vehicle and wherein the plurality of values of the acceleration are determined by:

a lateral acceleration sensor producing a first lateral acceleration value ($a_M$), a rotation rate sensor producing a rotation rate ($\Psi_M$) of the vehicle, and a speed sensor producing a vehicle speed (v), $\Psi_M$ and v used to calculate a second lateral acceleration value ($a_\Psi$) and a steering angle sensor producing a steering angle ($\delta_M$) of the vehicle, and a speed sensor producing a vehicle speed (v), $\delta_M$ and v used to calculate a third lateral acceleration value ($a_\delta$).

4. The method as claimed in claim 3, wherein the measured lateral acceleration ($a_M$) is rectified to a corrected lateral acceleration ($a_K$) by correcting the measured lateral acceleration value ($a_M$) by gravitational acceleration (g).

5. The method as claimed in claim 4, wherein the two signs of the corrected lateral acceleration value ($a_K$) and the rotation rate value ($\dot{\Psi}_D$), simultaneously measured by the rotation rate sensor, are used to assess the inclination of the roadway.

6. The method as claimed in claim 1, wherein the vehicle operating condition parameter comprises a steering angle ($\delta$) of the vehicle and wherein the plurality of values of the steering angle are determined by:

a steering angle sensor producing a first steering angle value ($\delta_M$), a lateral acceleration sensor producing a lateral acceleration (a) of the vehicle, and a speed sensor producing a vehicle speed (v), (a) and (v) used to calculate a second steering angle value ($\delta_a$), and a rotation rate sensor producing a rotation rate ($\Psi$), and a speed sensor producing a vehicle speed (v), $\Psi$ and v used to calculate a third steering angle value ($\delta_\Psi$).

7. The method as claimed in claim 1, wherein the simultaneously determined plurality of values of the selected parameter are sorted in terms of magnitude, and the sequence of the magnitudes determined in different ways indicates one of a laterally inclined right-hand bend, a laterally inclined left-hand bend, or the absence of a laterally inclined bend.

8. The method as claimed in claim 1, wherein a counter raises its value on each occasion when a laterally inclined bend is detected.

9. The method as claimed in claim 1, wherein a counter lowers its value on each occasion when an absence of a laterally inclined bend is detected.

10. The method as claimed in claim 9, wherein a determination of a laterally inclined bend is relayed to a vehicle dynamics stability controller, a vehicle safety device or to a vehicle driver when a count value of the counter falls outside a defined range of values.

11. The method as claimed in claim 8, wherein a determination of a laterally inclined bend is relayed to a vehicle dynamics stability controller, a vehicle safety device or to a vehicle driver only when a count value of the counter falls outside a defined range of values.

* * * * *